Aug. 2, 1932. O. G. SHERMAN Re. 18,549

BUCKLE

Original Filed Jan. 9, 1928

INVENTOR

Ozro G. Sherman, deceased,
by Frank Mashek, assignee.

Charles Wolfe

ATTY.

BY

Reissued Aug. 2, 1932

Re. 18,549

UNITED STATES PATENT OFFICE

OZRO G. SHERMAN, DECEASED, LATE OF CHICAGO, ILLINOIS, BY FRANK MASHEK, ASSIGNEE, OF CHICAGO, ILLINOIS

BUCKLE

Original No. 1,712,096, dated May 7, 1929, Serial No. 245,308, filed January 9, 1928. Application for reissue filed March 28, 1932. Serial No. 601,663.

The present invention relates to fastening devices or clasps, and more particularly to an improved buckle, including a bail or keeper for securing and retaining the free or detachable end of the strap or other strip of material with which the buckle is associated.

An object of the invention is to provide an improved buckle including a resiliently urged keeper for the free end of the strap connected to the buckle without rendering the buckle cumbersome or so increasing the cost of its manufacture as to make the same prohibitive.

Another object of the invention resides in the provision of an improved buckle including a resiliently urged keeper for the free end of the strap with which the buckle is associated, adapted to be flexed past a given dead center into and out of cooperation with the free end of the strap.

Still another object of the invention is to provide an improved buckle including a resiliently urged bail having a flat surface adapted to embrace the end of the strap connected to the buckle when the buckle is in a closed or effective position, and also providing a substantial finger grip and sufficient clearance whereby it may be moved into engagement with the free end of the strap.

A further object of the invention has to do with the provision of a buckle having a resiliently mounted keeper or bail connected to the buckle frame adjacent the cross bar for the tongue and adapted to be flexed past a predetermined dead center line into and out of operative association with the free end of the strap which it is designed to engage.

A still further object of the invention is to provide an improved fastening device adapted to be operated substantially in the manner in which a buckle is manipulated and without requiring any explanation or special movements, and which can be readily unfastened with a single movement and by which the operating parts may be placed in holding position without the necessity of threading the free end of the strap thru a corresponding loop or bail.

A further important object of the invention is the provision of a buckle, including a tongue and a keeper adapted to embrace the free end of the material connected to the buckle frame and adapted to be flexed with facility and without the necessity of exerting any considerable pressure thereon into and out of open and closed position, the keeper being designed for automatic movement into either closed or open positions once it is past a predetermined dead center line.

In accordance with the general features of the present invention, there is provided a buckle comprising a rectanguar frame, including a cross bar serving as a pivotal mounting for the tongue and a cross bar having associated therewith a resilient connection for a bail or keeper adapted to be fixed past a predetermined dead center line, disposed adjacent the cross bar for the tongue, into and out of operative association with the end of the strap or other strip of material engaged by the tongue, the keeper serving to take the place of a corresponding loop for the free end of the strap and being provided with finger gripping means whereby a single manipulation permits of the strap being disengaged by the tongue, as well as to move said keeper past the dead center line into its ineffective or inoperative position.

Other objects and advantages of the invention will more fully appear from the following detailed description taken in connection with the accompanying drawing, which illustrates several embodiments thereof and in which.

In the drawings.

Like reference characters designate similar parts throughout the several views.

Figure 1:
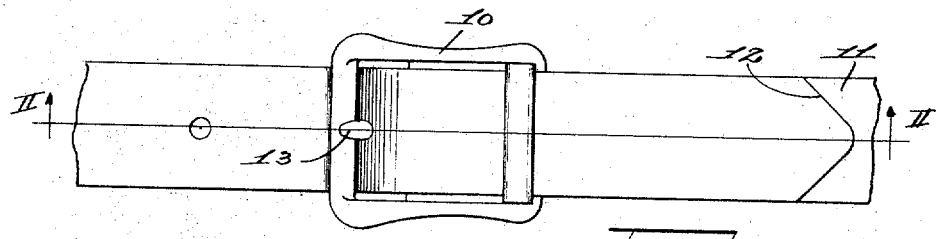
Figure 1 is a fragmentary plan view illustrating the buckle as being applied to the ends of a strap and showing the buckle with the keeper or bail in engagement with the free end of the strap.

The reference character 10 designates generally the rectangular frame of a buckle embodying the features of the invention. Secured to one end of this frame is an end of a strap 11 the free end 12 of which is adapted to engage the other end of the frame when it is secured in place by the tongue 13 of the buckle, as shown in Figure 1.

Figure 3:
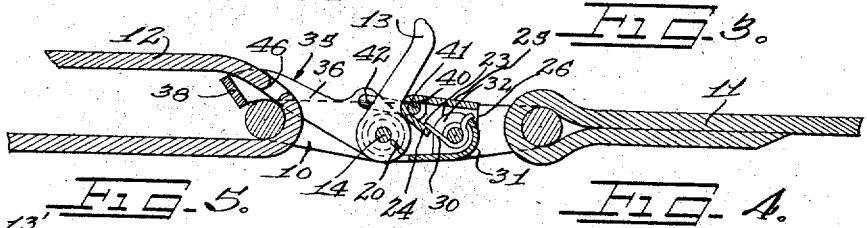
Figure 3 is a fragmentary sectional view similar to Figure 2, showing the tongue out of engagement with the free end of the strap and illustrating the keeper in its ineffective or inoperative position.
Figure 4:
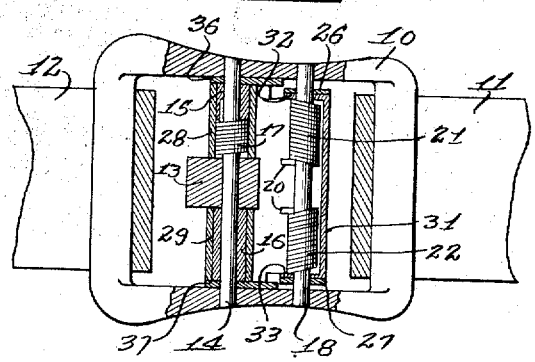
Figure 4 is a fragmentary sectional view taken on substantially the line IV—IV of Figure 2 looking downwardly.

The tongue 13 is pivotally mounted upon a cross rod or bar 14, the ends of which are secured to the frame 10 as best shown in Figure 4. Surrounding the rod 14 on each side of the tongue 13 is a pair of sleeves 15 and 16. Disposed between the sleeve 15 and the tongue 13, and surrounding rod 14, is a spring 17, one end of which is secured to the rod 14 and the other end of which is secured to the base of the tongue 13. This spring is adapted to at all times urge the tongue 13 to the position in which it is shown in Figure 3.

Figure 2:
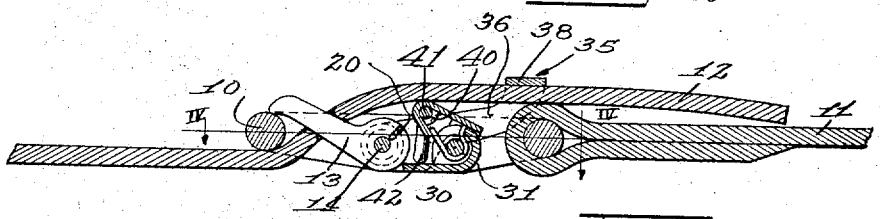
Figure 2 is a fragmentary sectional view taken on the line II—II of Figure 1, looking in the direction indicated by the arrows.

Also secured to the frame 10 and disposed parallel to the rod 14 is a cross bar 18, upon which is mounted a spring 20, including lefthand and righthand sections 21 and 22. The outer ends of these spring sections 21 and 22 are suitably anchored to the bar 18. The adjacent or inner ends of these two sections are connected as indicated at 23, and are adapted to engage the top surface of a downwardly extending leg 24 of a transverse cap member 25, disposed parallel to the bars 14 and 18. It will be noted that the leg 24 is bent downwardly and back over the main portion of the cap 25 (Figs. 2 and 3). The ends of the cap member 25 are provided with downwardly extending ears 26 and 27, which are pivotally mounted on the bar 18.

Attention is directed to the fact that the two sleeves 15 and 16 on bar 14 are covered by the sleeve-like or spaced turned portions 28 and 29 of the cover plate 30, which has its other end bent, as indicated at 31, up around the springs on bar 18 and in under the cap member 25 (Fig. 3). Thus, it will be evident that the spaced turned portions 28 and 29 are formed integral with the coverplate 30 and are adapted to encircle the sleeves 15 and 16 and the spring 17 on the bar 14 on both sides of tongue 13. Attention is also directed to the fact that the turned end 31 of this cover plate 30 is provided with spaced ears 32 and 33, which are mounted on bar 18.

Pivotally connected to the bar 14 is a bail or keeper designated generally by the reference character 35. This bail includes a pair of spaced arms 36 and 37, the free ends of which are pivotally mounted upon bar 14. The outer ends of these two arms 36 and 37 are connected together by a transverse plate 38, adapted, when in the position shown in Figure 2, to engage the free end 12 of the strap. It will be noted from Figure 2 that the ends of the arms 36 and 37 are curved outwardly, so as to raise the plate 38 a slight distance above the frame and the strap connected thereto, thus providing clearance between the plate and the frame and strap in which the free end 12 of the strap is adapted to be disposed. Also, attention is directed to the fact that in the operation of the buckle, as will become more apparent with the progress of the present description, the arms 36 and 37 of keeper 35 serve as finger grips by means of which the opening and closing of the buckle can be effected. Then, too, the slant of plate 38, when the keeper is in the open position shown in Figure 3, affords clearance between it and strap 11 whereby one's finger can readily engage same to flip keeper to its closed position.

In Figure 3, it will be noted that the cap portion 25 has formed integral with its sockets 40, one on each side of the downwardly extending leg 24. These sockets 40 are adapted to receive the transverse pin 41, which has its ends bent toward the bar 14 and into openings in the arms 36 and 37. This pin 41, together with its bent arms 42, forms a crank connection between the cap portion 25 and the keeper or bail 35.

The operation of this novel buckle is briefly as follows: It will be evident that the open position of the keeper or bail 35 is that in which it is shown in Figure 3. The free end 12 of the strap 11, to be engaged by the tongue 13, is inserted up thru the buckle frame 10 and over the edge of the top plate 38 of the keeper 35 into the position shown in Figure 3. The free end 12 of the strap 11 is then pulled until the strap is drawn tightly around the object which it encircles. This will dispose a hole 46 in the strap in a position in which it is ready to receive the end of the tongue 13, which, as previously described, is at all times urged into the position in which it is shown in Figure 3 through the means of spring 17.

Thereafter the tongue 13 is pushed downwardly to bring its end into cooperation with the hole 46. When this has been accomplished, the person manipulating the buckle places the fingers of his other hand on the finger grips afforded by arms 36 and 37 of the keeper 35 and moves the keeper upwardly about the axis of bar 14 to a position past the dead center line of the crank connection, at which time the spring 20 becomes effective to automatically move it into the engaged or closed position shown in Figure 2. In other words, the applicant has utilized the movement of flexing the free end of the strap over the buckle to move a keeper or bail into position over the free end of the strap.

The toggle or crank connection afforded by the crank 42 and the cap member 25 between the keeper and the bar 18 enables the spring 20 to become effective to move the keeper into either of its extreme positions, once the keeper has been moved past the dead center line of the toggle or crank connection.

When it is desired to disengage the free end 12 of the strap from the buckle, same may be accomplished by moving this end of the strap to the position shown in Figure 3, which releases the tongue 13 and allows the spring 17 to become effective to move the tongue to its disengaged position. It will, of course, be obvious that the return movement of the tongue 13 is limited by the tongue coming into engagement with the edge of the cap plate 25, which serves as a stop. Attention is also directed to the fact that, once the keeper 35 has been moved past the previously mentioned dead center line, the spring 20, thru its portion 23, engaging the leg 24 of cap 25, operates to force crank 42 downwardly, whereby the keeper is also moved downwardly under the effect of the spring 20. Thereafter, the free end 12 of the strap may be withdrawn from the buckle frame.

Figure 5:
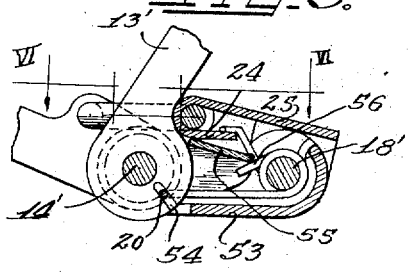
Figure 5 is an enlarged fragmentary sectional view showing a modified form of buckle construction and illustrating the tongue in a position similar to that of the tongue shown in Figure 3.
Figure 6:
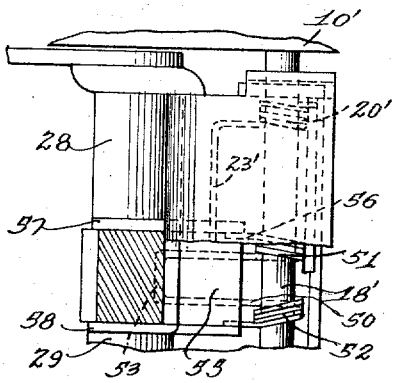
Figure 6 is a fragmentary plan view, partly in section, taken on the line VI—VI of Figure 5 looking downwardly.

In Figures 5 and 6 is illustrated an alternative form of the invention, wherein the spring means for actuating the tongue 13′ is mounted upon the bar 18′ instead of on the bar 14′. Outside of this feature, the buckle construction is substantially identical to that disclosed in Figures 1, 2, 3 and 4. It is, therefore, thought that a comprehensive understanding of this modification of the invention may be obtained by a description of the modified form of spring construction for the tongue 13′.

The cross bar 18′ connected to frame 10′ has mounted upon it the spring 20′, including a pair of spaced sections which are slightly smaller in length than the sections 21 and 22 shown in Figure 4. The adjacent ends of these sections are connected as indicated at 23′. This portion 23′ of the spring 20′ is adapted to engage the top surface of a downwardly extending leg 24 of cap member 25. Mounted upon the bar 18′, between the spaced sections of the spring 20′, is a spring 50, including spaced left-hand and right-hand sections 51 and 52. The adjacent ends of these two spring sections are connected by a portion designated by the reference character 53, which extends into a recess 54 in the base of the tongue 13′. The outermost ends of the spring sections 51 and 52 are bent laterally and are adapted to engage a plate 55, as indicated at 56 in Figures 5 and 6. This plate includes a pair of spaced arms 57 and 58, which are bent into circular portions mounted upon the turned portions 28 and 29 of the bottom cover plate 30. The remaining structure of this buckle is identical to that of the buckle shown in Figures 1 to 4 and hence, it is thought that no further description need be made of the details of this buckle.

It will be evident that the connecting portion 53 secured to the adjacent ends of the spring sections 51 and 52 will tend to at all times move the tongue in a clockwise direction about the axis of bar 14 (Fig. 5). This means that each time the tongue 13′ is released from engagement with the strap, it will immediately be moved to the uppermost or vertical position shown in Figure 5, due to the dissipation of the stored spring energy.

Now, it is desired to be understood that, altho there is illustrated and described in detail the preferred forms of this invention, the invention is not to be thus limited only in so far as defined by the scope and spirit of the appended claims.

What is claimed is:

1. As an article of manufacture, a buckle comprising a frame, a tongue pivotally connected to the frame for engaging the free end of material associated with said frame, a keeper pivotally connected to the frame arranged to engage said free end of said material which is connected to the frame, and means associated with said frame for snapping said keeper to engaged and disengaged positions relative to the free end of the material, said keeper being movable with said free end of the material over the top of the buckle frame into a position wherein it engages the top surface of said end of the material.

2. As an article of manufacture, a buckle comprising a frame, a tongue pivotally connected to the frame for engaging the free end of material associated with said frame, a keeper arranged to fit over and engage said free end of said material associated with the buckle, a toggle connection for said keeper connected to said frame, and means including a resilient member associated with said toggle connection for forcing said keeper into a given position, once it is moved past a predetermined dead center line associated with the toggle connection.

3. As an article of manufacture, a buckle comprising a frame, a tongue pivotally connected to the frame for engaging the free end of a strap assoicated with said frame, a keeper connected to the frame and arranged to fit over and engage said free end of said strap connected to said buckle frame, a toggle connection between said keeper and said frame, and means including a resilient member acting on said keeper thru said connection to force said keeper into engaged and disengaged positions relative to the strap.

4. As an article of manufacture, a buckle comprising a frame, a tongue pivotally connected to the frame for engaging the free end of material associated with said frame, a keeper for said free end of said material connected to the buckle frame, means including a resilient member to urge said keeper into engagement with the top surface of said end of the material, and means connected to said tongue for forcing said tongue into its disengaged position, said means becoming effective only when said keeper is moved to a position wherein said end of the material is to be removed from the buckle frame.

5. As an article of manufacture, a buckle comprising a frame, a tongue pivotally connected to the frame for engaging the free end of material associated with said frame, a keeper for said free end of said material associated with the buckle frame in such a manner as to be arranged for automatic movement into closed and open positions once it is moved past a predetermined dead center line, and means including a resilient member for effecting said automatic movement of the keeper.

6. As an article of manufacture, a buckle comprising a frame, a tongue pivotally connected to the frame for engaging the free end of material associated with the buckle frame, a keeper for said free end of said material arranged for automatic movement into closed and open positions once it is moved past a predetermined dead center line, and means for effecting said automatic movement of the keeper including a resilient member, a cross bar connected to said frame to which said resilient member is connected, and leverage means associated with said bar thru which said resilient member acts on said keeper.

7. As an article of manufacture, a buckle comprising a frame, a tongue pivotally connected to the frame for engaging the free end of material associated with said buckle frame, a keeper for said free end of said material arranged for automatic movement into closed and open positions once it is moved past a predetermined dead center line, means including a resilient device for effecting said automatic movement of the keeper, a cross bar for said resilient means connected to said frame, and means associated with said tongue and for at all times urging said tongue toward its disengaged position.

8. As an article of manufacture, a buckle comprising a frame, a tongue connected to the frame for engaging the free end of a strip of material, a keeper connected to said frame formed to hold said free end of the strip in cooperation with the frame, and means connecting said keeper to said frame for snapping it past a predetermined dead center line into engaged and disengaged positions with respect to said free end of the strip.

9. As an article of manufacture, a buckle comprising a frame, a tongue connected to the frame for engaging the free end of a strip of material, a keeper connected to said frame formed to hold said free end of the strip in cooperation with the frame, and means connecting said keeper to said frame for snapping it past a predetermined dead center line into engaged and disengaged positions with respect to said free end of the strip, said keeper being designed so that when it is in a disengaged position said free end of the strip may be drawn over the same to permit of the disengagement of the tongue from said strip.

10. As an article of manufacture, a buckle comprising a frame, a gripping member connected to the frame for engaging the free end of a strip of material, a keeper connected to said frame formed to hold said free end of the strip in cooperation with the frame, and resilient means connecting said keeper to said frame for snapping it past a predetermined dead center line into engaged and disengaged positions with respect to said free end of the strip.

11. As an article of manufacture, a buckle comprising a frame, a gripping member connected to the frame for engaging the free end of a strip of material, a U-shaped keeper connected to said frame formed to hold said free end of the strip in cooperation with the frame, and means connecting said keeper to said frame for snapping it past a predetermined dead center line into engaged and disengaged positions with respect to said free end of the strip.

In testimony whereof, I have hereunto subscribed my name at Chicago, Cook County, Illinois.

FRANK MASHEK,
*Assignee of Ozro K. Sherman, Deceased.*